United States Patent
Lindbo et al.

(10) Patent No.: US 12,012,281 B2
(45) Date of Patent: Jun. 18, 2024

(54) STORAGE SYSTEMS AND METHODS

(71) Applicant: OCADO INNOVATION LIMITED, Hatfield (GB)

(72) Inventors: Lars Sverker Ture Lindbo, Hatfield (GB); Paul Clarke, Hatfield (GB); Andrew John Ingram-Tedd, Hatfield (GB); Pawel Karolinczak, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 17/540,769

(22) Filed: Dec. 2, 2021

(65) Prior Publication Data

US 2022/0089369 A1 Mar. 24, 2022

Related U.S. Application Data

(63) Continuation of application No. 16/268,169, filed on Feb. 5, 2019, now Pat. No. 11,299,344, which is a
(Continued)

(30) Foreign Application Priority Data

Apr. 15, 2015 (GB) .................................... 1506365
Aug. 13, 2015 (GB) .................................... 1514428
(Continued)

(51) Int. Cl.
*B65G 1/04* (2006.01)
*A62C 2/24* (2006.01)
(Continued)

(52) U.S. Cl.
CPC ............ *B65G 1/0464* (2013.01); *A62C 2/247* (2013.01); *A62C 3/002* (2013.01); *A62C 35/68* (2013.01);
(Continued)

(58) Field of Classification Search
CPC ...... B65G 1/0464; B65G 1/065; B65G 57/03; A01G 9/022; A01G 9/16; A01G 31/06
See application file for complete search history.

(56) References Cited

U.S. PATENT DOCUMENTS

| 2,701,065 A | 2/1955 | Bertel |
| 3,744,193 A | 7/1973 | Lau et al. |

(Continued)

FOREIGN PATENT DOCUMENTS

| CN | 101971036 A | 2/2011 |
| CN | 202201256 U | 4/2012 |

(Continued)

OTHER PUBLICATIONS

Office Action (Second Review of the Opinion Notice) dated Oct. 17, 2022, by the Chinese Patent Office in corresponding Chinese Patent Application No. 202110664271.7, and an English Translation of the Office Action. (13 pages).
(Continued)

*Primary Examiner* — Kaitlin S Joerger
(74) *Attorney, Agent, or Firm* — Buchanan Ingersoll & Rooney PC

(57) ABSTRACT

A storage system is described where goods are stored in containers and the containers are stored in stacks. Above the stacks runs a grid network of tracks on which load handling devices run. The load handling devices take containers from the stacks and deposit then at alternative locations in the stacks or deposit then at stations where goods may be picked out. Each container may be provided with connectors having a push fit male connector located at a top edge of the container and a female connector at a bottom edge of the container. Adjacent containers in a stack can be linked by routing means, which form moldings on each container. The connectors can also have spring-loaded contacts. The provision of these services within individual containers rather
(Continued)

than across the system as a whole, allows for flexibility in storage whilst reducing cost and inefficiency.

9 Claims, 14 Drawing Sheets

Related U.S. Application Data continuation of application No. 15/555,772, filed as application No. PCT/EP2016/058467 on Apr. 15, 2016, now Pat. No. 10,196,209.

(30) Foreign Application Priority Data

| Oct. 13, 2015 | (GB) | 1518089 |
|---|---|---|
| Oct. 13, 2015 | (GB) | 1518091 |
| Oct. 13, 2015 | (GB) | 1518094 |
| Oct. 13, 2015 | (GB) | 1518111 |
| Oct. 13, 2015 | (GB) | 1518115 |
| Oct. 13, 2015 | (GB) | 1518117 |
| Feb. 9, 2016 | (GB) | 1602332 |
| Feb. 25, 2016 | (GB) | 1603328 |

(51) Int. Cl.

| A62C 3/00 | (2006.01) |
|---|---|
| A62C 35/68 | (2006.01) |
| A62C 99/00 | (2010.01) |
| E04B 1/94 | (2006.01) |
| E04B 2/74 | (2006.01) |
| A01G 9/02 | (2018.01) |
| A01G 9/16 | (2006.01) |
| A01G 9/18 | (2006.01) |
| A01G 31/06 | (2006.01) |
| A47L 7/00 | (2006.01) |
| B62D 33/02 | (2006.01) |
| B65D 21/02 | (2006.01) |
| B65G 1/06 | (2006.01) |
| B65G 1/137 | (2006.01) |
| B65G 57/03 | (2006.01) |
| B65G 63/00 | (2006.01) |
| B65G 67/02 | (2006.01) |
| E04B 1/348 | (2006.01) |
| E04H 6/18 | (2006.01) |
| E06B 9/68 | (2006.01) |

(52) U.S. Cl.
CPC ............ *A62C 99/0018* (2013.01); *E04B 1/94* (2013.01); *E04B 2/7403* (2013.01); *E04B 2/7409* (2013.01); *A01G 9/022* (2013.01); *A01G 9/16* (2013.01); *A01G 9/18* (2013.01); *A01G 31/06* (2013.01); *A47L 7/0047* (2013.01); *B62D 33/02* (2013.01); *B62D 33/0207* (2013.01); *B65D 21/0212* (2013.01); *B65G 1/0407* (2013.01); *B65G 1/0478* (2013.01); *B65G 1/065* (2013.01); *B65G 1/137* (2013.01); *B65G 57/03* (2013.01); *B65G 63/004* (2013.01); *B65G 67/02* (2013.01); *B65G 2207/22* (2013.01); *B65G 2207/40* (2013.01); *E04B 1/34807* (2013.01); *E04H 6/18* (2013.01); *E06B 9/68* (2013.01); *E06B 2009/6818* (2013.01); *Y02A 40/25* (2018.01); *Y02P 60/14* (2015.11); *Y02P 60/21* (2015.11); *Y10S 901/01* (2013.01)

(56) References Cited

U.S. PATENT DOCUMENTS

| 4,088,232 | A | 5/1978 | Lilly et al. | |
|---|---|---|---|---|
| 4,561,554 | A | 12/1985 | Swincicki et al. | |
| 4,599,829 | A | 7/1986 | DiMartino et al. | |
| 4,723,381 | A | 2/1988 | Straumsnes et al. | |
| 4,917,429 | A | 4/1990 | Giger | |
| 4,973,219 | A | 11/1990 | Brickner et al. | |
| 6,152,287 | A | 11/2000 | Luria | |
| 6,654,662 | B1 | 11/2003 | Hognaland | |
| 8,408,863 | B1 | 4/2013 | Benedict et al. | |
| 8,628,289 | B1 | 1/2014 | Benedict et al. | |
| 9,702,610 | B2 * | 7/2017 | Iwasa | H02J 50/12 |
| 10,196,209 | B2 | 2/2019 | Lindbo et al. | |
| 11,299,344 | B2 | 4/2022 | Lindbo et al. | |
| 2002/0057956 | A1 | 5/2002 | Jephcott et al. | |
| 2003/0005626 | A1 * | 1/2003 | Yoneda | A01G 9/246 47/69 |
| 2003/0141973 | A1 | 7/2003 | Yeh et al. | |
| 2003/0156501 | A1 | 8/2003 | Spindel et al. | |
| 2004/0016624 | A1 | 1/2004 | Jephcott et al. | |
| 2005/0220573 | A1 | 10/2005 | Benedict et al. | |
| 2006/0201377 | A1 | 9/2006 | Gielow et al. | |
| 2007/0016328 | A1 | 1/2007 | Ziegler et al. | |
| 2007/0065259 | A1 | 3/2007 | Talley | |
| 2008/0075566 | A1 | 3/2008 | Benedict et al. | |
| 2008/0075568 | A1 | 3/2008 | Benedict et al. | |
| 2008/0075569 | A1 | 3/2008 | Benedict et al. | |
| 2008/0134458 | A1 | 6/2008 | Ziegler et al. | |
| 2008/0140255 | A1 | 6/2008 | Ziegler et al. | |
| 2008/0155768 | A1 | 7/2008 | Ziegler et al. | |
| 2008/0213073 | A1 | 9/2008 | Benedict et al. | |
| 2010/0275512 | A1 | 11/2010 | Nien et al. | |
| 2011/0027059 | A1 | 2/2011 | Benedict et al. | |
| 2011/0192082 | A1 | 8/2011 | Uchiyama et al. | |
| 2011/0271469 | A1 | 11/2011 | Ziegler et al. | |
| 2012/0036659 | A1 | 2/2012 | Ziegler et al. | |
| 2012/0147558 | A1 | 6/2012 | Dunn et al. | |
| 2012/0272500 | A1 * | 11/2012 | Reuteler | B65G 1/0464 414/277 |
| 2013/0011226 | A1 * | 1/2013 | Camenisch | B65G 1/0464 414/277 |
| 2013/0312450 | A1 | 11/2013 | Iwasa et al. | |
| 2014/0026474 | A1 | 1/2014 | Kulas et al. | |
| 2014/0069007 | A1 | 3/2014 | Chen et al. | |
| 2014/0157794 | A1 | 6/2014 | Mcgann | |
| 2014/0191633 | A1 * | 7/2014 | Zhu | B42F 21/065 312/184 |
| 2014/0283452 | A1 | 9/2014 | Dittman et al. | |
| 2014/0289992 | A1 | 10/2014 | Ziegler et al. | |
| 2015/0045944 | A1 | 2/2015 | Visser et al. | |
| 2015/0127143 | A1 * | 5/2015 | Lindbo | G05B 15/02 700/218 |
| 2015/0284165 | A1 | 10/2015 | Deyen | |
| 2016/0095309 | A1 * | 4/2016 | Reuteler | B65G 1/06 414/281 |
| 2016/0129587 | A1 * | 5/2016 | Lindbo | G05B 19/4189 700/218 |
| 2016/0140488 | A1 | 5/2016 | Lindbo | |
| 2018/0035625 | A1 * | 2/2018 | Lindbo | E04B 2/7409 |
| 2018/0044111 | A1 * | 2/2018 | Clarke | A62C 35/68 |
| 2018/0051459 | A1 * | 2/2018 | Clarke | A62C 35/68 |
| 2018/0237221 | A1 * | 8/2018 | Lindbo | A62C 2/247 |
| 2019/0241362 | A1 | 8/2019 | Lindbo et al. | |
| 2023/0286745 | A1 | 9/2023 | Lindbo et al. | |

FOREIGN PATENT DOCUMENTS

| CN | 102431754 A | 5/2012 |
|---|---|---|
| CN | 102756890 A | 10/2012 |
| CN | 202704094 U | 1/2013 |
| DE | 2719953 A1 | 7/1978 |
| DE | 4028059 A1 | 3/1992 |
| DE | 4439740 C1 | 5/1996 |
| DE | 102011103443 A1 | 12/2012 |
| DE | 102012025154 A1 | 6/2014 |

(56) References Cited

FOREIGN PATENT DOCUMENTS

| | | | |
|---|---|---|---|
| EP | 0326422 | A2 | 8/1989 |
| EP | 0442600 | A2 | 8/1991 |
| EP | 0767113 | B1 | 7/2002 |
| EP | 1037828 | B1 | 9/2003 |
| EP | 2133289 | A1 | 12/2009 |
| EP | 2308283 | A1 | 4/2011 |
| EP | 2783913 | A2 | 10/2014 |
| EP | 2829210 | A2 | 1/2015 |
| EP | 3283404 | A1 | 2/2018 |
| GB | 1157145 | A | 7/1969 |
| GB | 2514930 | A | 12/2014 |
| GB | 2518259 | A | 3/2015 |
| GB | 2520104 | A | 5/2015 |
| GB | 2527543 | A | 12/2015 |
| GB | 2528573 | A | 1/2016 |
| GB | 2529029 | A | 2/2016 |
| GB | 2529527 | A | 2/2016 |
| JP | H05288447 | A | 11/1993 |
| JP | H08319005 | A | 12/1996 |
| JP | 09299496 | A | 11/1997 |
| JP | 2000255786 | A | 9/2000 |
| JP | 2004323169 | A | 11/2004 |
| JP | 2006327773 | A | 12/2006 |
| JP | 2008204419 | A | 9/2008 |
| JP | 2011502912 | A | 1/2011 |
| JP | 2012056659 | A | 3/2012 |
| JP | 2015013736 | A | 1/2015 |
| JP | 2016507426 | A | 3/2016 |
| LU | 88754 | A1 | 10/1996 |
| NO | 317366 | B1 | 10/2004 |
| TW | M444348 | U1 | 1/2013 |
| WO | 9204713 | A1 | 3/1992 |
| WO | 9738928 | A1 | 10/1997 |
| WO | 9849075 | A1 | 11/1998 |
| WO | 03031285 | A1 | 4/2003 |
| WO | 03095339 | A1 | 11/2003 |
| WO | 2004096609 | A1 | 11/2004 |
| WO | 2008108845 | A2 | 9/2008 |
| WO | 2011047710 | A1 | 4/2011 |
| WO | 2011048058 | A1 | 4/2011 |
| WO | 2013027761 | A1 | 2/2013 |
| WO | 2013082601 | A1 | 6/2013 |
| WO | 2013147597 | A1 | 10/2013 |
| WO | 2013162192 | A1 | 10/2013 |
| WO | 2013167907 | A1 | 11/2013 |
| WO | 2013169110 | A1 | 11/2013 |
| WO | 2014195901 | A1 | 12/2014 |
| WO | 2014195902 | A1 | 12/2014 |
| WO | 2014203126 | A1 | 12/2014 |
| WO | 2015019055 | A1 | 2/2015 |
| WO | 2015105426 | A1 | 7/2015 |
| WO | 2016166354 | A1 | 10/2016 |

OTHER PUBLICATIONS

First Office Action dated May 25, 2022, by the Chinese Patent Office in corresponding Chinese Patent Application No. 202110664271.7, and an English Translation of the Office Action. (18 pages).
Office Action (Decision of Rejection) dated Apr. 20, 2021, by the Japanese Patent Office in corresponding Japanese Patent Application No. 2020-012199, and an English Translation of the Office Action. (6 pages).
Office Action (Notification of Reason for Refusal) dated Jun. 23, 2021, by the Korean Patent Office in corresponding Korean Patent Application No. 10-2017-7024509, and an English Translation of the Office Action. (6 pages).
Office Action dated Jun. 29, 2021, by the Canadian Patent Office in corresponding Canadian Patent Application No. 2,978,163. (4 pages).
Search Report dated Mar. 8, 2016, by the European Patent Office for Application No. 1518089.6.
Search Report dated Dec. 21, 2016, by the European Patent Office for Application No. 1606677.1.
Search Report dated Dec. 22, 2016, by the European Patent Office for Application No. 1606679.7.
First Office Action issued for JP 2020012199, English Translation, dated Oct. 22, 2020, 8 pages.
Office Action (Decision of Rejection) for JP 2020-012199, 6 pages.
International Search Report (PCT/ISA/210) dated Aug. 30, 2016, by the European Patent Office as the International Searching Authority for International Application No. PCT/EP2016/058366.
Written Opinion (PCT/ISA/237) dated Aug. 30, 2016, by the Japanese Patent Office as the International Searching Authority for International Application No. PCT/EP2016/058366.
International Search Report (PCT/ISA/210) dated Jul. 18, 2016, by the European Patent Office as the International Searching Authority for International Application No. PCT/EP2016/058381.
Written Opinion (PCT/ISA/237) dated Jul. 18, 2016, by the Japanese Patent Office as the International Searching Authority for International Application No. PCT/EP2016/058381.
International Search Report (PCT/ISA/210) dated Jul. 19, 2016, by the European Patent Office as the International Searching Authority for International Application No. PCT/EP2016/058384.
Written Opinion (PCT/ISA/237) dated Jul. 19, 2016, by the Japanese Patent Office as the International Searching Authority for International Application No. PCT/EP2016/058384.
International Search Report (PCT/ISA/210) dated Jul. 14, 2016, by the European Patent Office as the International Searching Authority for International Application No. PCT/EP2016/058385.
Written Opinion (PCT/ISA/237) dated Jul. 14, 2016, by the Japanese Patent Office as the International Searching Authority for International Application No. PCT/EP2016/058385.
International Search Report (PCT/ISA/210) dated Jul. 18, 2016, by the European Patent Office as the International Searching Authority for International Application No. PCT/EP2016/058405.
Written Opinion (PCT/ISA/237) dated Jul. 18, 2016, by the Japanese Patent Office as the International Searching Authority for International Application No. PCT/EP2016/058405.
International Search Report (PCT/ISA/210) dated Jul. 14, 2016, by the European Patent Office as the International Searching Authority for International Application No. PCT/EP2016/058407.
Written Opinion (PCT/ISA/237) dated Jul. 14, 2016, by the Japanese Patent Office as the International Searching Authority for International Application No. PCT/EP2016/058407.
International Search Report (PCT/ISA/210) dated Jul. 20, 2016, by the European Patent Office as the International Searching Authority for International Application No. PCT/EP2016/058466.
Written Opinion (PCT/ISA/237) dated Jul. 20, 2016, by the Japanese Patent Office as the International Searching Authority for International Application No. PCT/EP2016/058466.
International Search Report (PCT/ISA/210) dated Jul. 15, 2016, by the European Patent Office as the International Searching Authority for International Application No. PCT/EP2016/058467.
Written Opinion (PCT/ISA/237) dated Jul. 15, 2016, by the Japanese Patent Office as the International Searching Authority for International Application No. PCT/EP2016/058467.
Office Action dated Nov. 14, 2022, by the Canadian Patent Office in corresponding Canadian Patent Application No. 2,978,163 (3 pages).
First Office Action dated Aug. 30, 2022, by the Japanese Patent Office in corresponding Japanese Patent Application No. 2021-123052, and an English Translation of the Office Action. (4 pages).
Office Action dated Mar. 16, 2022, by the Canadian Patent Office in corresponding Canadian Patent Application No. 2,978,163. (4 pages).
Office Action (Request for the Submission of an Opinion) issued on May 25, 2023, by the Korean Patent Office in corresponding Korean Patent Application No. 10-2022-7028324, and an English Translation of the Office Action. (13 pages).
Office Action issued on Dec. 1, 2023, by the U.S. Patent and Trademark Office in U.S. Appl. No. 18/320,516.

* cited by examiner

STORAGE SYSTEMS AND METHODS

CROSS-REFERENCE TO RELATED APPLICATIONS

This application is a continuation patent application of U.S. patent application Ser. No. 16/268,169, filed Feb. 5, 2019, the entire content of which are incorporated herein.

SUMMARY

The present invention relates to storage systems. More specifically but not exclusively, it relates to storage systems having storage bins or containers in stacks.

This application claims priority from UK Patent Application Nos. GB1506365.4 filed 15 Apr. 2015, GB1514428.0 filed 13 Aug. 2015, GB1518089.6 filed 13 Oct. 2015, GB1602332.7 filed 9 Feb. 2016, GB1518091.2 filed 13 Oct. 2015, GB1518094.6 filed 13 Oct. 2015, GB1518111.8 filed 13 Oct. 2015, GB1518115.9 filed 13 Oct. 2015, GB1518117.5 filed 13 Oct. 2015 and GB1603328.4 filed 25 Feb. 2016 the content of all these applications hereby being incorporated by reference.

Some commercial and industrial activities require systems that enable the storage and retrieval of a large number of different products. One known type of system for the storage and retrieval of items in multiple product lines involves arranging storage containers or containers in stacks on top of one another, the stacks being arranged in rows. The storage containers or containers are accessed from above, removing the need for aisles between rows and allowing more containers to be stored in a given space.

In known storage and retrieval systems described more fully below, the containers are passive and exist simply to hold the goods. Whilst the identity of a given container may be known and linked to its contents by barcoding for example, the containers in the system have no active components or on board intelligence.

In shipping container systems, the containers comprise monitoring and controlling systems to, for example, containers that chill the contents, containers that comprise gas monitoring systems, for example, to monitor for fruit ripening and containers that comprise locating means to enable individual containers to be tracked and traced in port.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference. FIGS. 3a and 3b are schematic perspective views of a load handling device from the rear and front, respectively, and FIG. 3c is a schematic front perspective view of a load handling device lifting a bin.

A further development of load handling device is described in UK Patent Application No 1314313.6 (Ocado) where each robotic load handler only covers one grid space, thus allowing higher density of load handlers and thus higher throughput of a given size system.

In such known storage systems a large number of containers are stacked densely. The contents of the containers may degrade, may require lighting, heating or cooling, or may need some form of monitoring or control not currently provided by known systems.

According to the invention there is provided a storage system comprising: a first set of parallel rails or tracks and a second set of parallel rails or tracks extending transverse to the first set in a substantially horizontal plane to form a grid pattern comprising a plurality of grid spaces; a plurality of storage containers 10 arranged in stacks, located beneath the rails and; at least one load handling device disposed on the grid, arranged to move laterally above the stacks on the rails, the load handling device comprising a lifting device arranged to lift one or more containers, or parts thereof, from a stack; wherein a number of the containers comprise service means for providing services to the or each container thereby enabling individual containers within the stacks to perform additional functions.

According to the invention there is further provided a method of condition monitoring a storage system comprising the steps of: providing sensor means and data logging and storage means within a storage container; providing communication means to communicate data logged to a central data logging device; positioning the container within a storage system to be monitored; and monitoring the data received.

Advantageously, in accordance with one form of the invention, individual containers within the storage system may be provided with services in addition to goods. Furthermore, individual containers within the storage system may not contain goods but may contain services for provision to other containers or to monitor or control the condition of the system.

In this way, depending on the services provided in individual containers, the contents may be controlled or monitored for data relating to the contents of the bin to be relayed to a central processing system. Furthermore, services and conditions within the containers or containers may be controlled, for example temperature, moisture, lighting or other parameters. Control functions may be provided either by a local control system in the bin or by a central system sending signals to actuators in the containers. Moreover, control and monitoring may be achieved for peer to peer communication via wireless or other means, between non-adjacent containers. The data transmitted may provide information on the condition of the bin, the contents of the bin or may provide information on adjacent containers to condition monitor the entire storage system. Furthermore, in this way, the containers may be heated or cooled as required by the specific contents of the bin.

In this way, the present invention overcomes the problems of the prior art and provides a system and method of increasing the reliability and reducing the overall cost of large bin handling storage systems.

BRIEF DESCRIPTION OF THE DRAWINGS

The invention will now be described with reference to the accompanying diagrammatic drawings in which:

FIG. 7a shows an expanded view of the connector means on the container of FIG. 5a;

As shown in FIGS. 1 and 2, stackable containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

Figure 1:
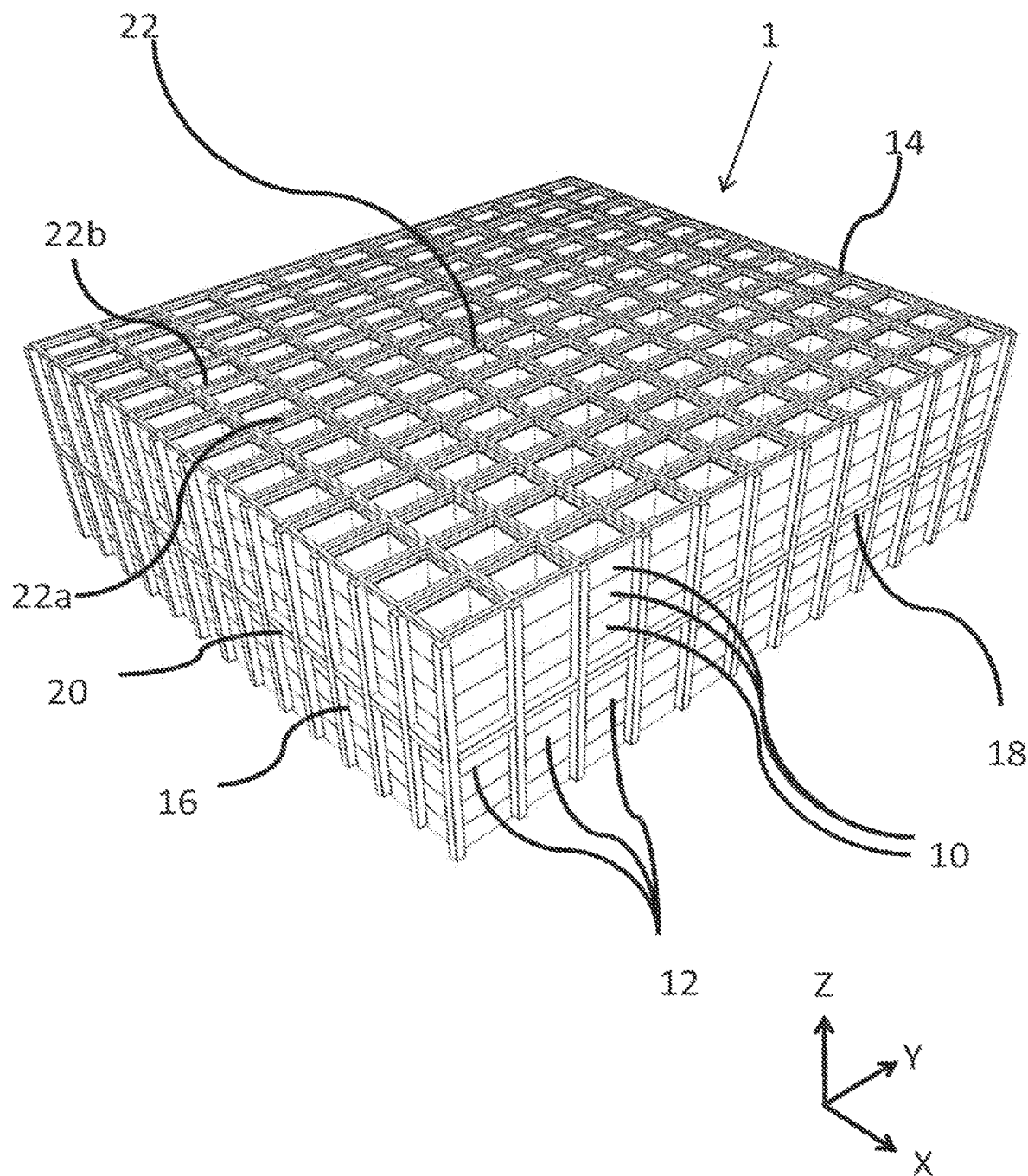
FIG. 1 is a schematic perspective view of a frame structure for housing a plurality of stacks of containers in a storage system.
Figure 2:
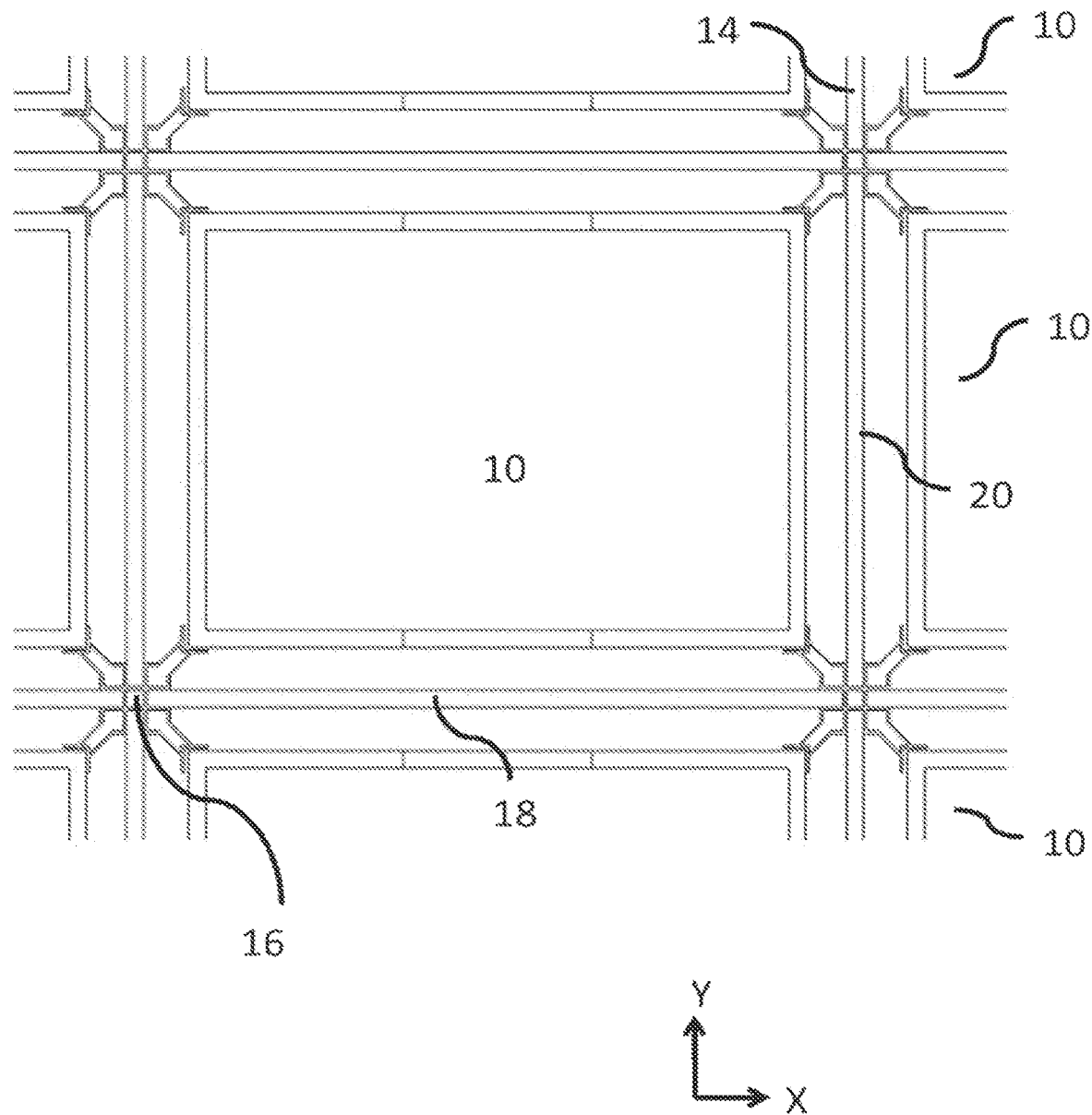
FIG. 2 is a schematic plan view of part of the frame structure of FIG. 1.

The frame structure 14 comprises a plurality of upright members 16 that support substantially horizontal members 18, 20. A first set of substantially parallel substantially horizontal members 18 is arranged perpendicularly to a second set of substantially parallel substantially horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 3A:
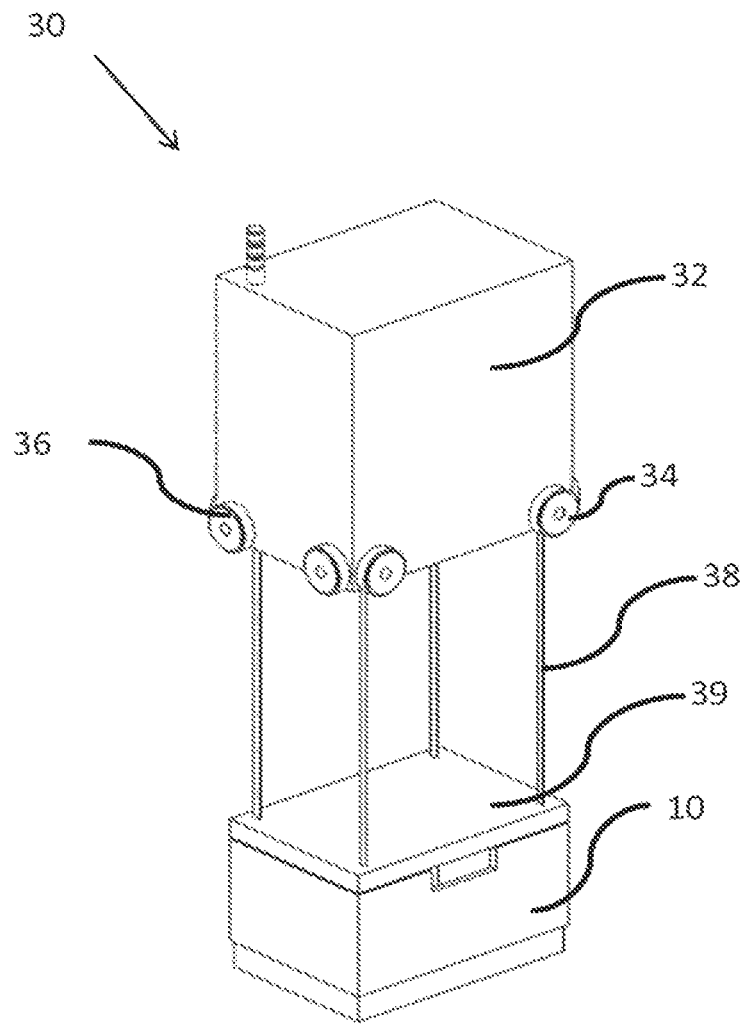
FIGS. 3a and 3b are schematic perspective views, from the rear and front respectively, of one form of robotic load handling device for use with the frame structure of FIGS. 1 and 2.
Figure 3B:
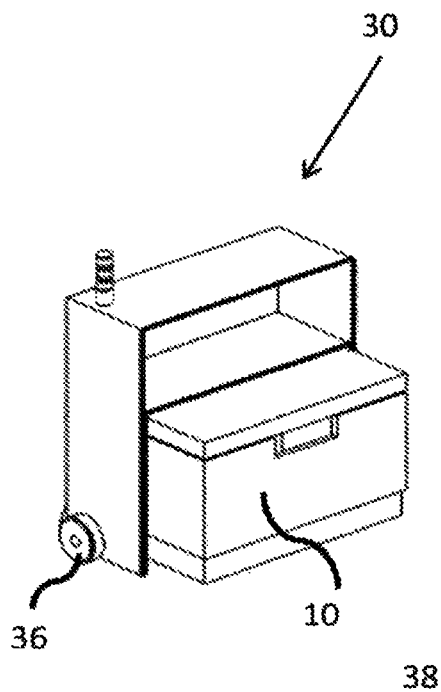
Figure 3C:
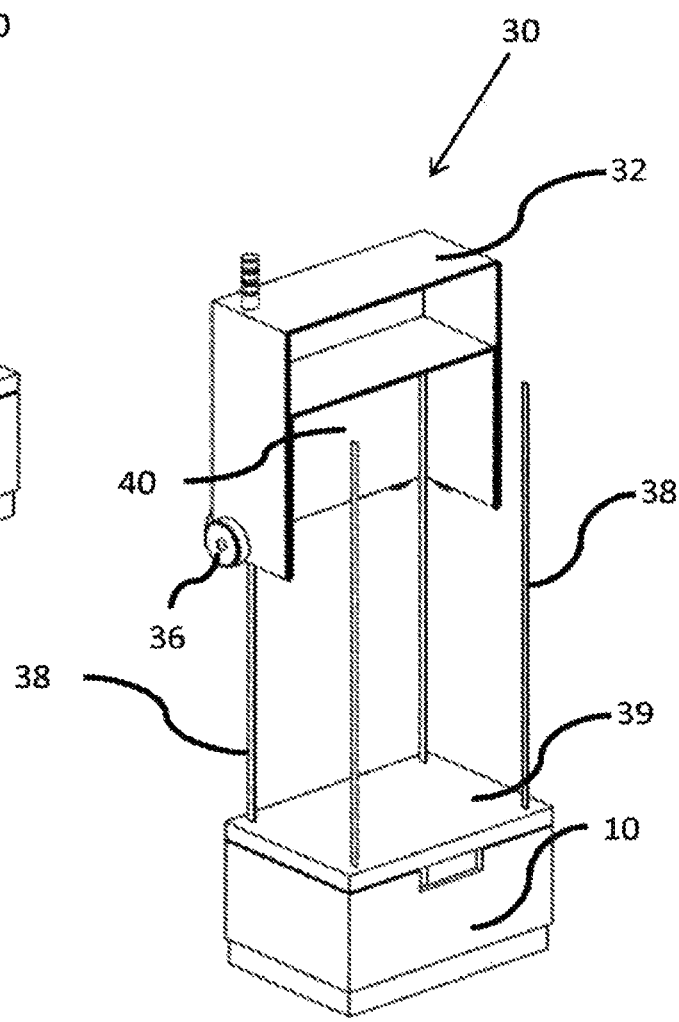
FIG. 3c is a schematic perspective view of the known load handler device in use lifting a bin.
Figure 4:
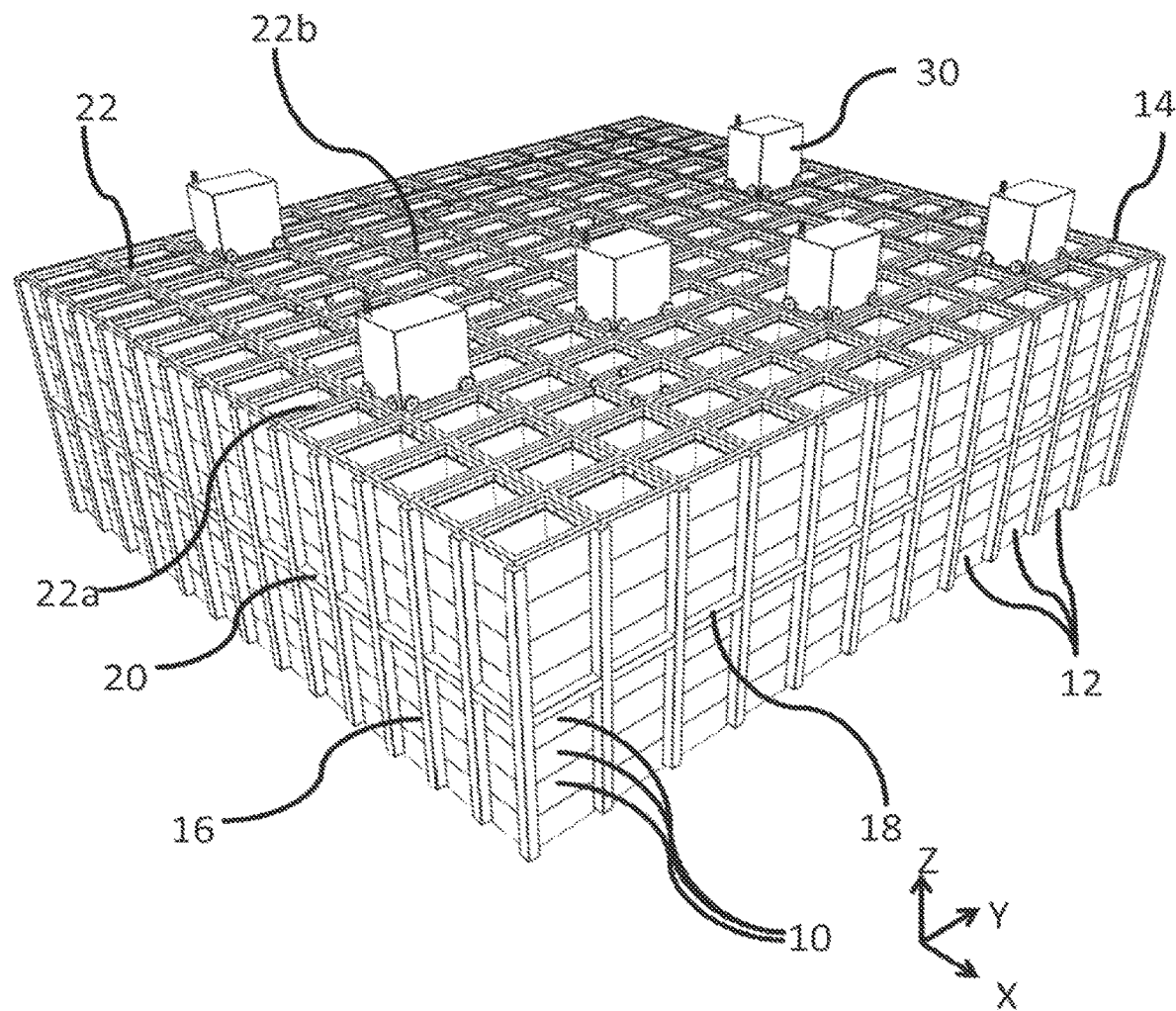
FIG. 4 is a schematic perspective view of a known storage system comprising a plurality of load handler devices of the type shown in FIGS. 3a, 3b and 3c, installed on the frame structure of FIGS. 1 and 2, together with a robotic service device in accordance with one form of the invention.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack 12 to access the required products. In this way, multiple products can be accessed from multiple locations in the grid and stacks at any one time.

It will be appreciated that if the required container 10 is not at the top of the stack 12, if each load handling device can only carry a single container 10 then multiple load handling devices will need to co-operate in order to access the target container 10.

FIG. 4 shows a typical storage system as described above, the system having a plurality of load handling devices 30 active on the stacks 12 in order to co-operate to retrieve and replace containers 10 from and to the stacks 12. Unwanted containers 10 removed from stacks 12 in the pursuit of a target container 10 are placed back in to the stacks 12 at vacant positions.

FIGS. 1 and 4 show the bins 10 in stacks 12 within the storage system. It will be appreciated that there may be a large number of bins in any given storage system and that many different goods may be stored in the stacks, each bin may contain different goods within a single stack 12 or similar goods in similar stacks or multiple inventory items in an individual container 10. Whilst the above described system was conceived to store and retrieve groceries in an online shopping e-commerce solution, it will be appreciated that other uses are envisaged and that other items such as parcels and letters may be stored in the containers 10.

Figure 5A:
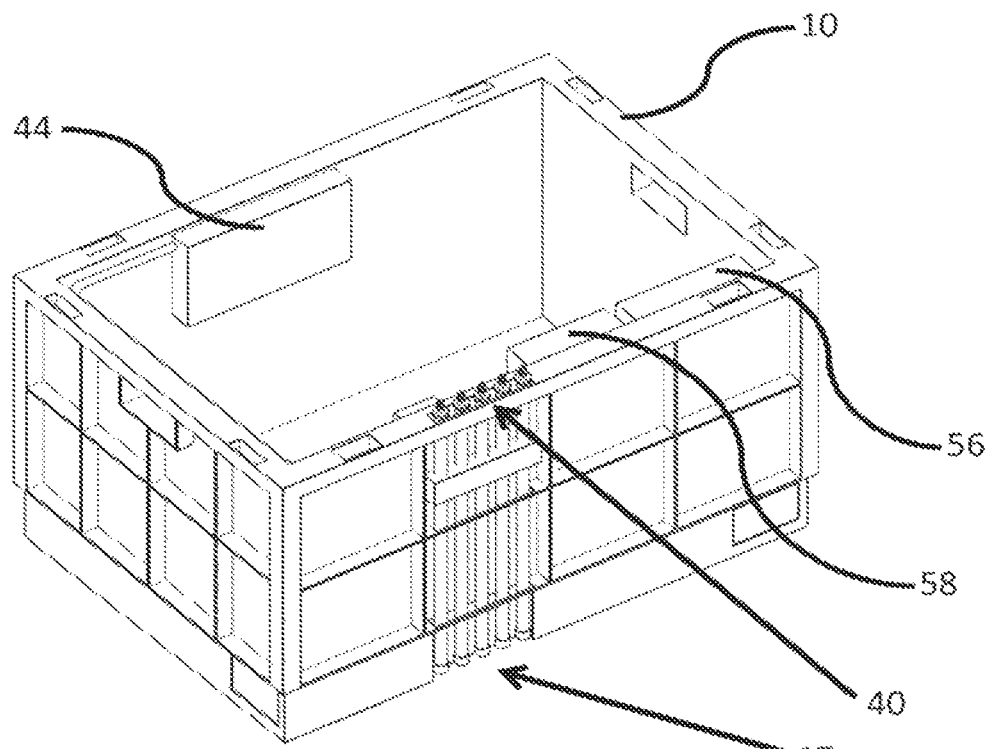
FIGS. 5a and 5b are schematic perspective views of one form of container in accordance with the invention, FIG. 5a showing a view of one side and FIG. 5b showing the opposite side view of the same container, the container comprising services and utilities connected via connection means, the connection means being supplied via routing means located on at least one side of the container.
Figure 5B:
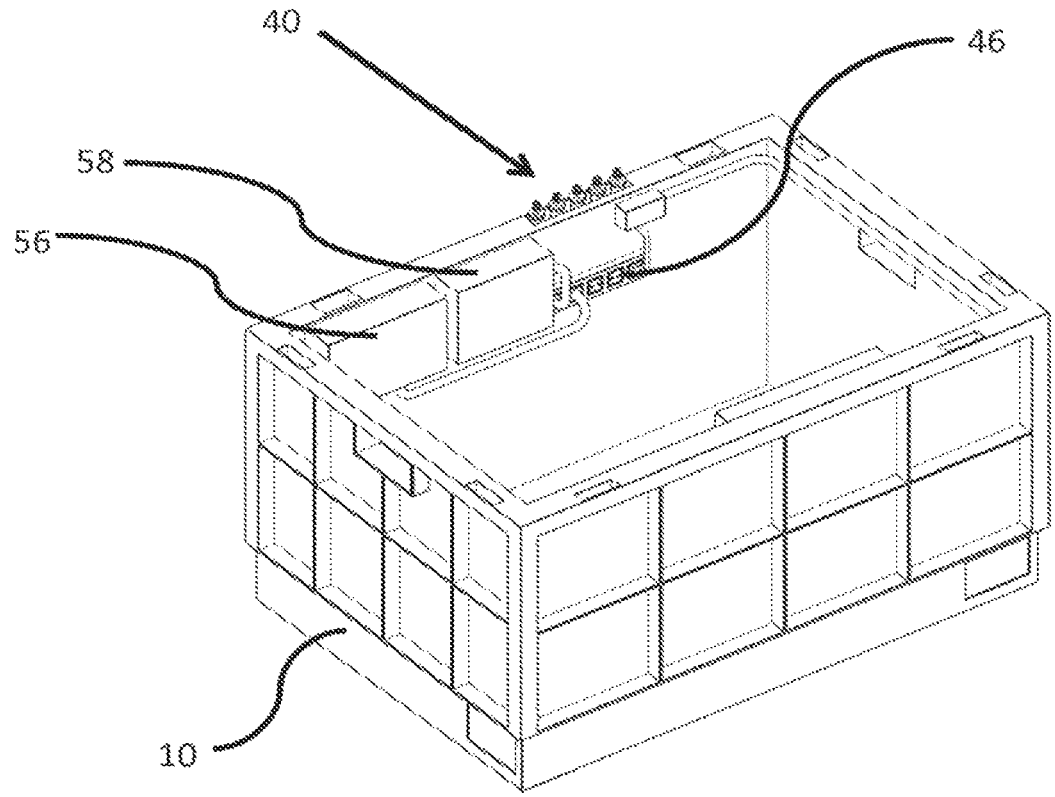

FIGS. 5a and 5b show a container 10 in accordance with one form of the invention, the container 10 capable of being held in stacks by co-operating surfaces forming interference fits between adjacent containers 10. The container 10 of FIGS. 5a and 5b, additionally comprises connection means 40 at the co-operating surface where containers will cooperate in order to form a stack 12 of containers 10. The connection means 40 shown in FIGS. 5a and 5b comprises a push fit male connector 40 located at the top edge of the container 10. The bottom edge of the container comprises a female connector. The two containers are linked by routing means that may form part of the container 10 as mouldings or may be pipes, cables, wires or other routing means mounted on the surface of the side of the container 10. It will be appreciated that this form of connector means and routing means is one form only of connector and routing means that may be used, any suitable form of releasable connector means capable of latching or connecting and unlatching or disconnecting as required on movement of the container in or out of the stack 12.

For example, the connection means 40 may comprise electrically conductive layers deposited on the co-operating surfaces of the containers 10 or may comprise sprung-loaded contacts or springs as contacts or any other connection means capable of carrying power, data or other signals between two or more containers 10. Non-contacting methods of power transmission may also be used, for example magnetic induction or RF induction and optical methods.

Furthermore, the connection means 40 may comprise carbon loaded rubber contacts capable of carrying signals or data between two or more co-operating containers 10 in a stack.

Whilst the containers may be held in stacks 12 by interference means or by adjacent containers 10 having shaped, co-operating surfaces, containers 10 may be latched together via suitable latching means (not shown). The latching means may act to releasably latch two or more containers 10 together in the stack 12. The latching means must be capable of remote operation in order that the load handling means may lift individual containers 10 or a plurality of containers 10 latched together. Any form of remotely latching and unlatching means may be used. For example electromagnetic latching means or any other means suitable to perform the function.

Figure 6A:
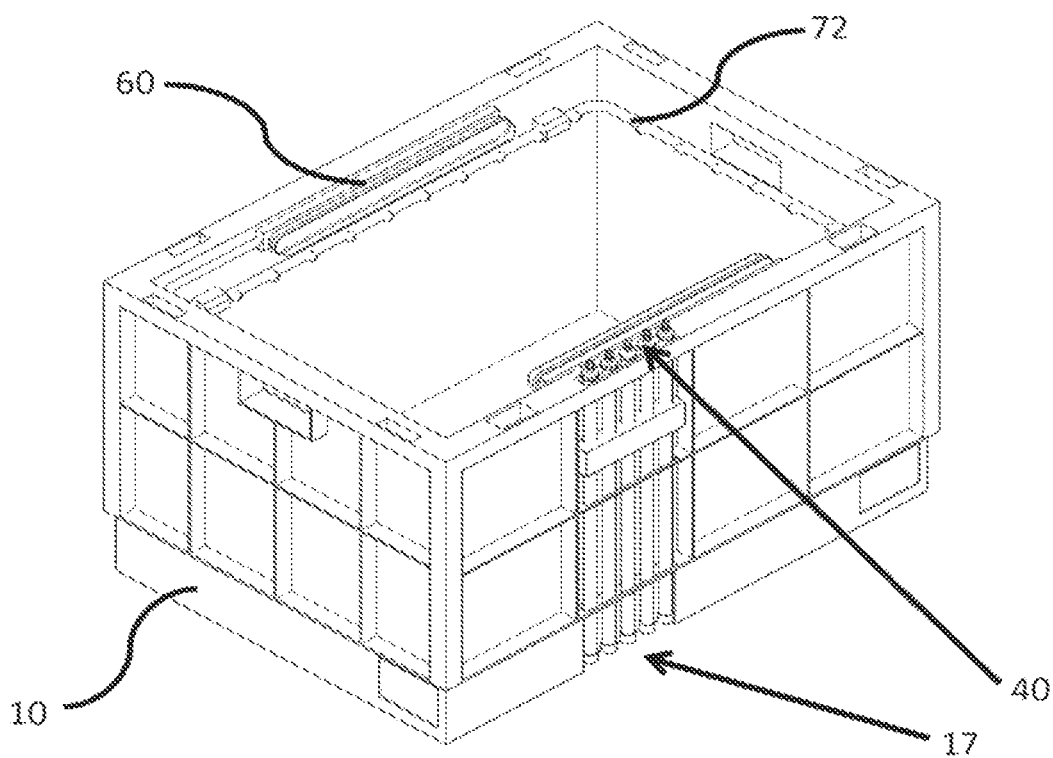
FIGS. 6a and 6b are schematic perspective views of another form of container in accordance the invention, the container comprising lighting means and fluid supply means.
Figure 6B:
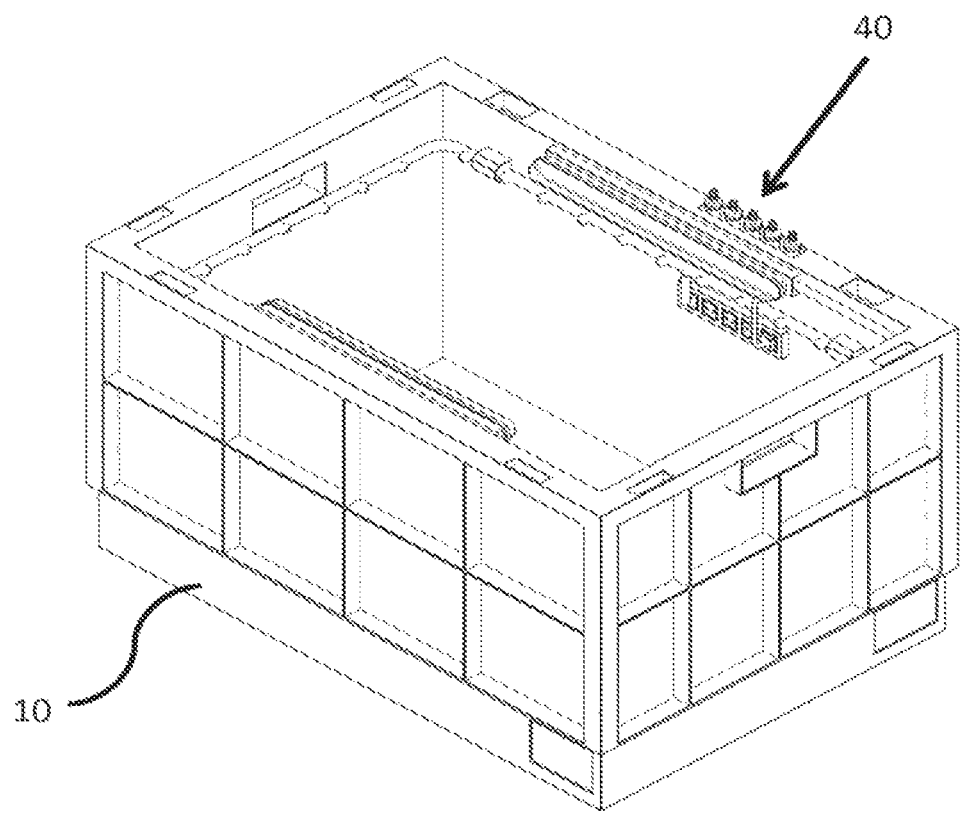

FIGS. 5a and 5b further show an individual bin 10 comprising power supply means 42 for supplying power to, for example, heating means 56, cooling means 58, data logging means 44, communication means 46 and/or lighting means 60 in FIGS. 6a and 6b. The bin 10 further comprises power control means 43 for controlling the power to the or each service and controlling the power to other containers 10 in the stack 12, if power is to be transmitted to adjacent containers 10 in the stack 12. It will be appreciated that containers 10 comprising power control and control means may power heaters 56, coolers 58, lights 60 or any other service requiring power. Anything requiring power may utilise the power supply means 42. The power supply means may comprise batteries or may comprise means for transmitting power from an external power source through connection means 52 on the containers 10 from the base of the storage system or via the uprights 16 of the grid.

Furthermore, power, data or any other signals may be supplied to the containers 10 in the stacks 12 via power and or data connectors located in the floor of the warehouse. Power may be transmitted up the stacks 12 via the contacts 52 in the co-operating surfaces of the containers 10. Moreover, services may flow up stacks 12 of containers 10 from the floor, for example cooling or heating fluids may be utilised in this manner.

FIGS. 5a and 5b further show an individual bin 10 comprising at least data logging means 44 and communication means 46 for transmitting data recorded to a remote central data logging device. The data logging means 44 comprises sensors suitable for monitoring the conditions in the bin 10, for example the temperature, any gas emission, for example as a result of decomposing fruit, and humidity. The data logging means 44 and communicating means 46 enable the content and condition of individual containers 10 to be monitored.

Furthermore, knowing information about specific containers 10 in the stacks 12 in the system enables the condition of the storage system as a whole to be monitored. Whilst the containers 10 per se may be anonymous, a unique identity may be assigned to each bin 10 in the storage system. In this way, the location of each bin 10 (and its contents) may be trackable and identifiable by the system via the communications means. In this way, the topology of the containers 10 can be constructed as a result of each container 10 having knowledge of the identity of the immediately adjacent containers 10 and the bottom container 10 in any stack having knowledge that there are no containers 10 below.

It will be appreciated that any type and method of communication may be used, for example WiFi, Bluetooth, 3-wire serial, SigFox or other proprietary systems such as that described in UK Patent Application No. GB1509793.4 to Ocado Innovation Limited, the contents of which in hereby incorporated by reference. It will be appreciated that any other suitable communications means or protocol may be used.

FIGS. 5a and 5b further show an individual bin 10 from the stack 12, the bin 10 comprising heating 56 and/or cooling means 58 and temperature monitoring means 50 for monitoring the temperature in the bin 10. The heating means 56 may comprise flow of hot fluid via direct means, for example hot air, or indirect means, for example radiator means or may further comprise electrical heaters or electromagnetic induction heaters.

The cooling means 58 may comprise Peltier coolers or may comprise flow of cold fluid via direct means, for example cold air or via indirect means, for example radiator means, including ice slurry compressor driven.

In these ways, the temperatures of individual containers 10 may be monitored, controlled and varied depending on the content of the individual bin 10. If the contents of the bin need to be chilled or frozen, then the individual bin can have a temperature of 5 degrees C. maintained, for chilled, and lower for frozen, rather than requiring a portion of the stacks 12 in the storage system to be maintained at a predetermined temperature by space heaters and coolers.

It will be appreciated that these are examples only and any suitable form of heater or chiller may be used to achieve the desired effect. The containers 10 may be designed and arranged such that each bin 10 is sealed, for example in an airtight fashion, by the bin 10 located above. The top bin 10 in each stack 12 may be provided with a lid, not shown, to seal the top bin 10. Sealing the containers 10 in this fashion enables the temperature within an individual bin to be more easily controlled by suitable heating or cooling means.

FIGS. 6a and 6b show an alternative form of the container 10 comprising lighting means 60 and fluid supply means 72. The same connectors 40 and 17 may be used to route power to the lighting means 60 or water, for example to the fluid supply means 72.

Figure 7A:
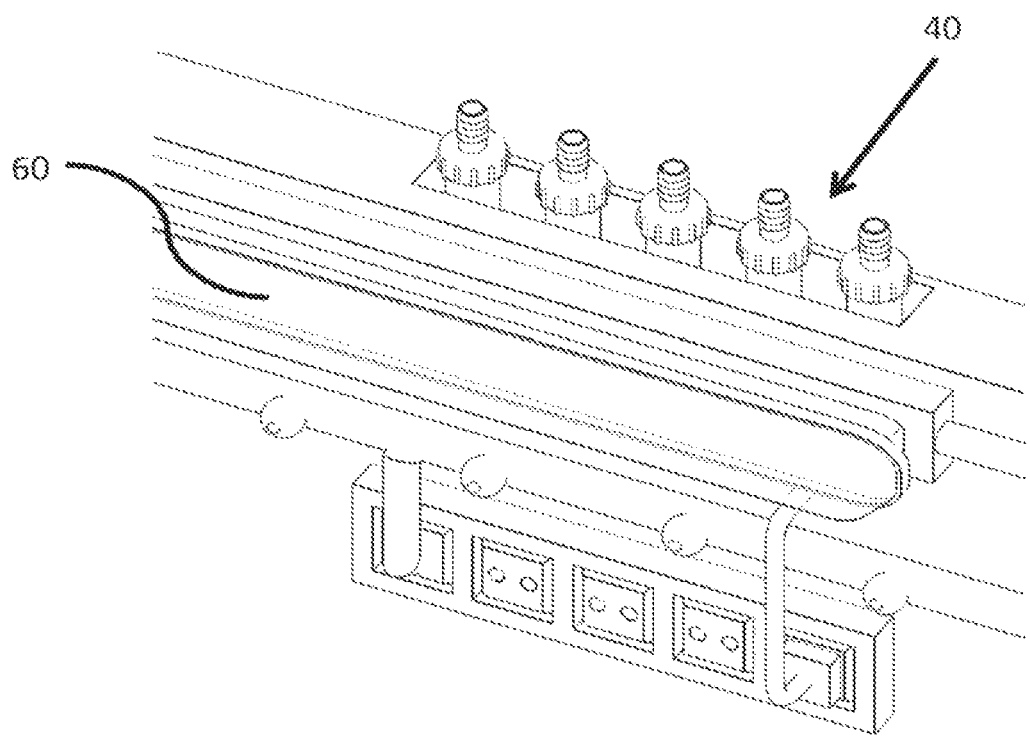
Figure 7B:
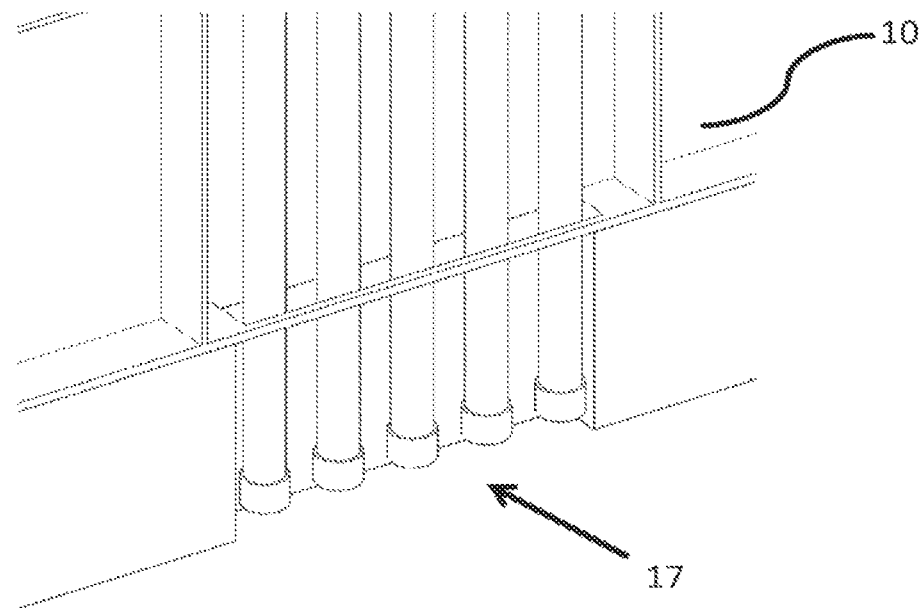
FIG. 7b shows an expanded view of the routing means on the container of FIG. 5b.

FIGS. 7a and 7b show and expanded view of the male connector 40 and the female connector 17 located on or in the side of the container 10. FIGS. 7a and 7b show one example only of the connection means that may form the connections between adjacent containers 10 in a stack 12 of containers 10 in detail.

Figure 8A:
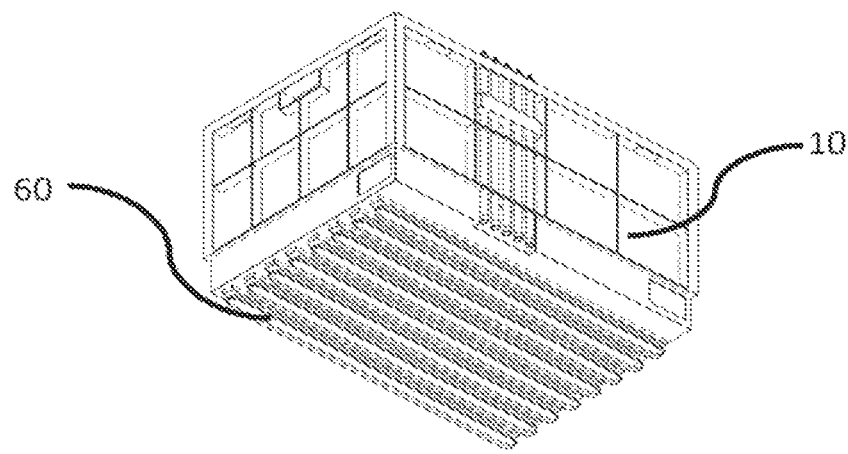
FIGS. 8a, 8b and 8c are schematic perspective views of a container in accordance with a further form of the invention, the container comprising lighting means in the container or a part thereof.
Figure 8B:
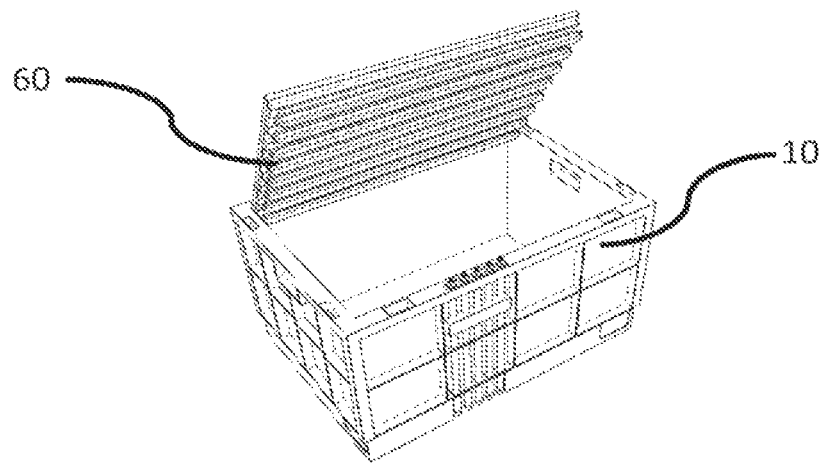
Figure 8C:
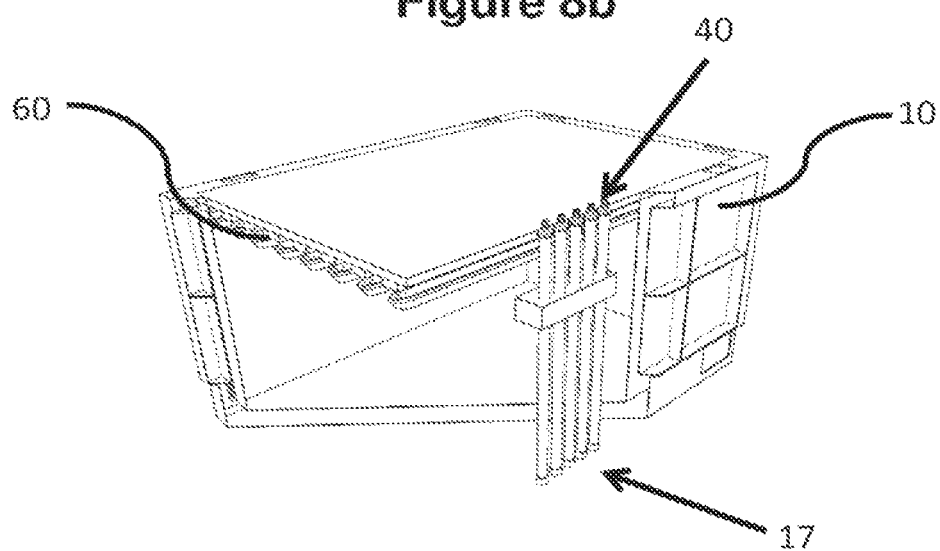

FIG. 8 shows three examples of an individual bin 10 from the stack 12, the bin 10 comprising lighting means. The lighting means 60 may be provided in the base of a bin to light the bin 10 below. Alternatively the lighting means 60 may comprise a lid 62 containing suitable bulbs, LEDs or any other suitable form of lighting. The lid 62 may be removeably attached to the bin 10 and fold away during removal of the bin 10 from the stack 12. Again the power supply to the lighting means 60 is supplied via the connector means 40 and 17 located on the container 10.

Figure 9:
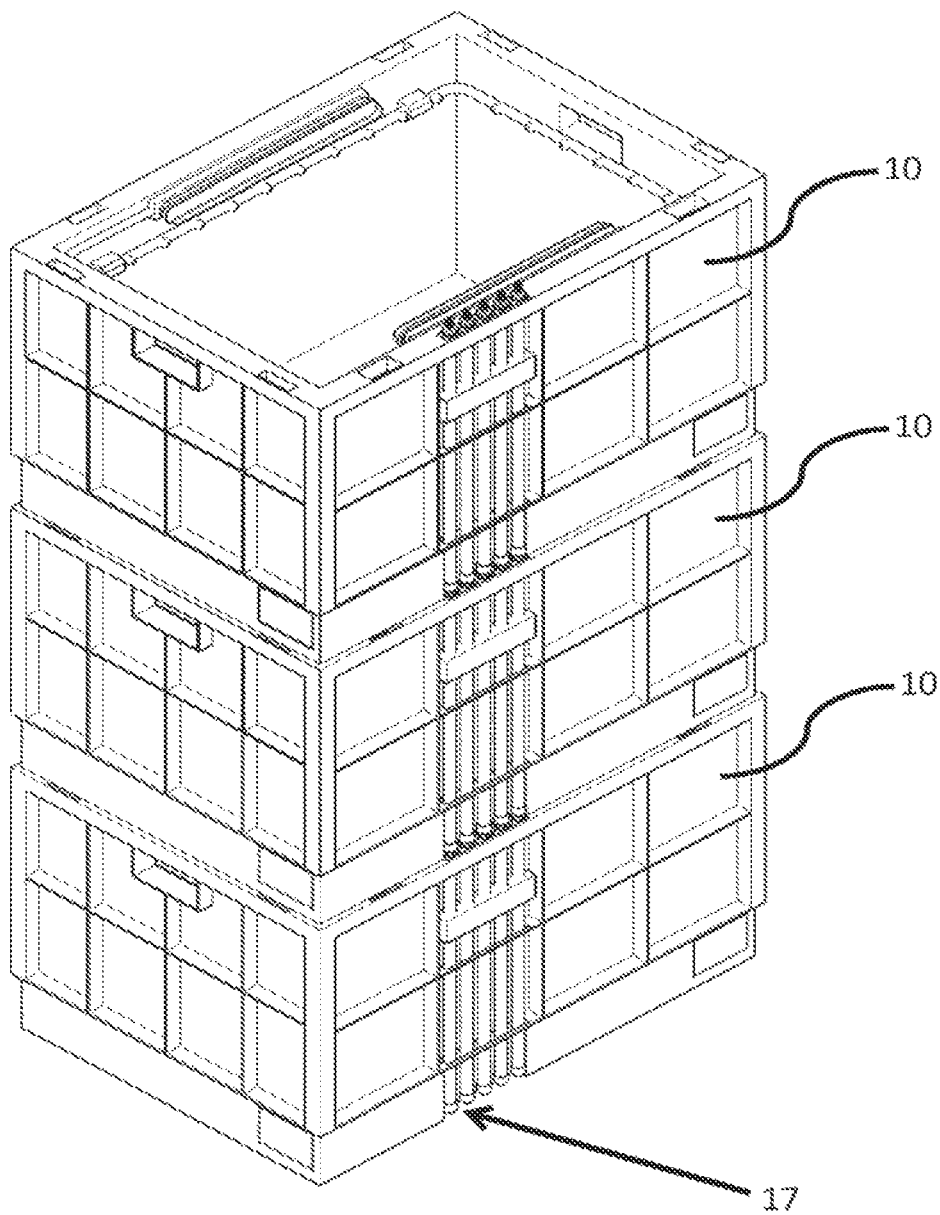
FIG. 9 is a schematic perspective view of a stack of the containers of FIGS. 6a and 6b showing the connectors on the containers cooperating when the containers are stacked in a stack.

FIG. 9 shows a stack of containers 10 shown in FIG. 8. The containers 10 comprise fluid supply means and lighting means 60. The connectors 40 and 17 cooperate together to connect each container 10 the container immediately above and below. In this way, services such as power, to power the lighting means 60 or water to irrigate the contents of an individual container 10 may be routed through the containers in the stacks 12.

Figure 10:
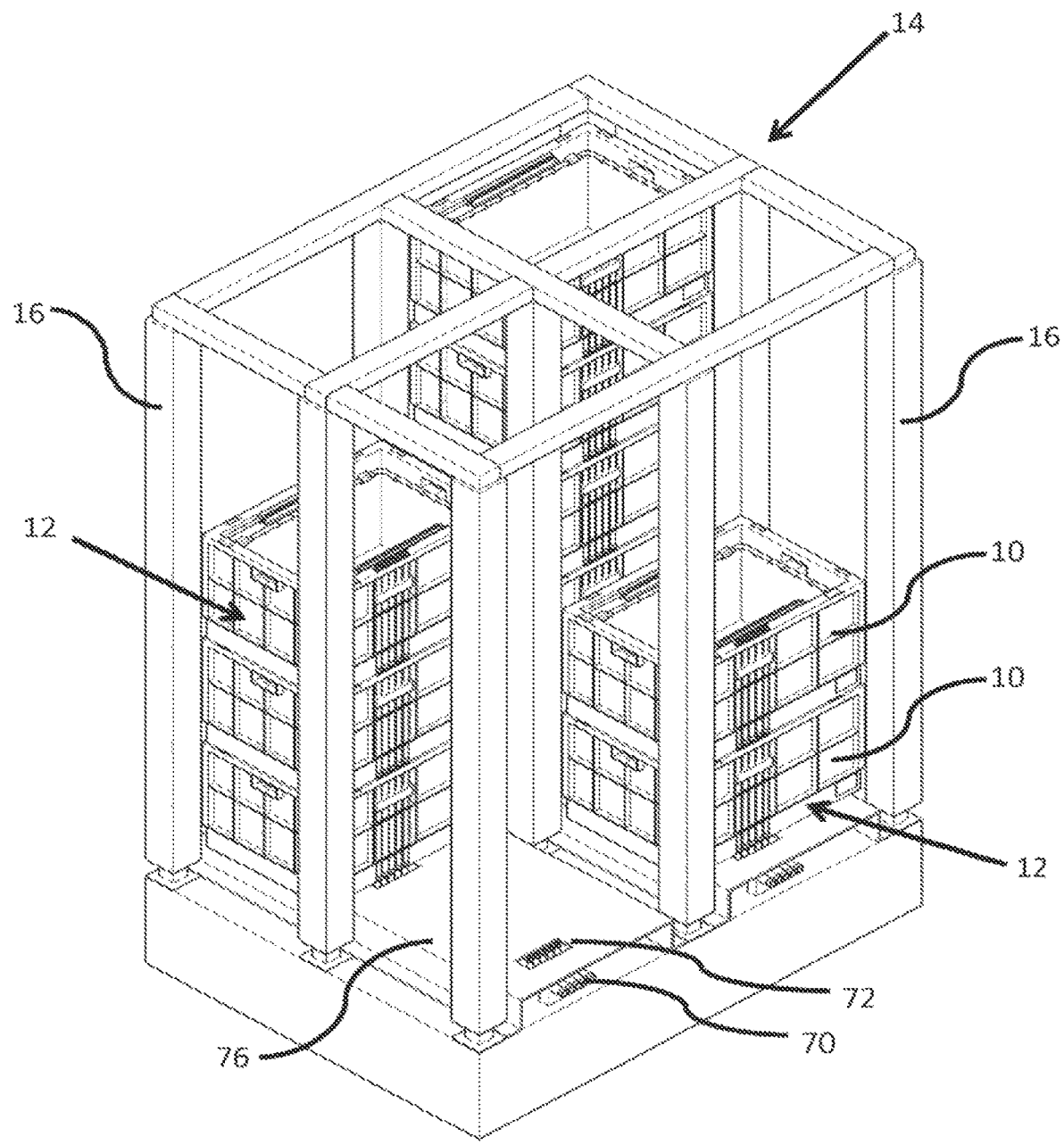
FIG. 10 is a schematic perspective view of the stack of containers of FIG. 9 in accordance with another form of the invention, the containers being located within a framework of one form of a storage and retrieval system, the connectors further connecting to supply means located in the base of the storage and retrieval system.

FIG. 10 shows a portion of the framework of the storage system comprising a plurality of containers located therein, the containers 10 carrying services upwardly through the system by wires, cables or pipes or any other suitable means 17. As can be seen in more detail in FIG. 10, the bottom container 10 in the stack 12 connects to supply means routed through the base of the storage system via connectors 72. It will be appreciated that the supply means in the base may be located in a false base 76 of the system as shown in FIG. 10 but may otherwise be routed under the floor of the building comprising the storage system or may be routed via other means.

Figure 11:
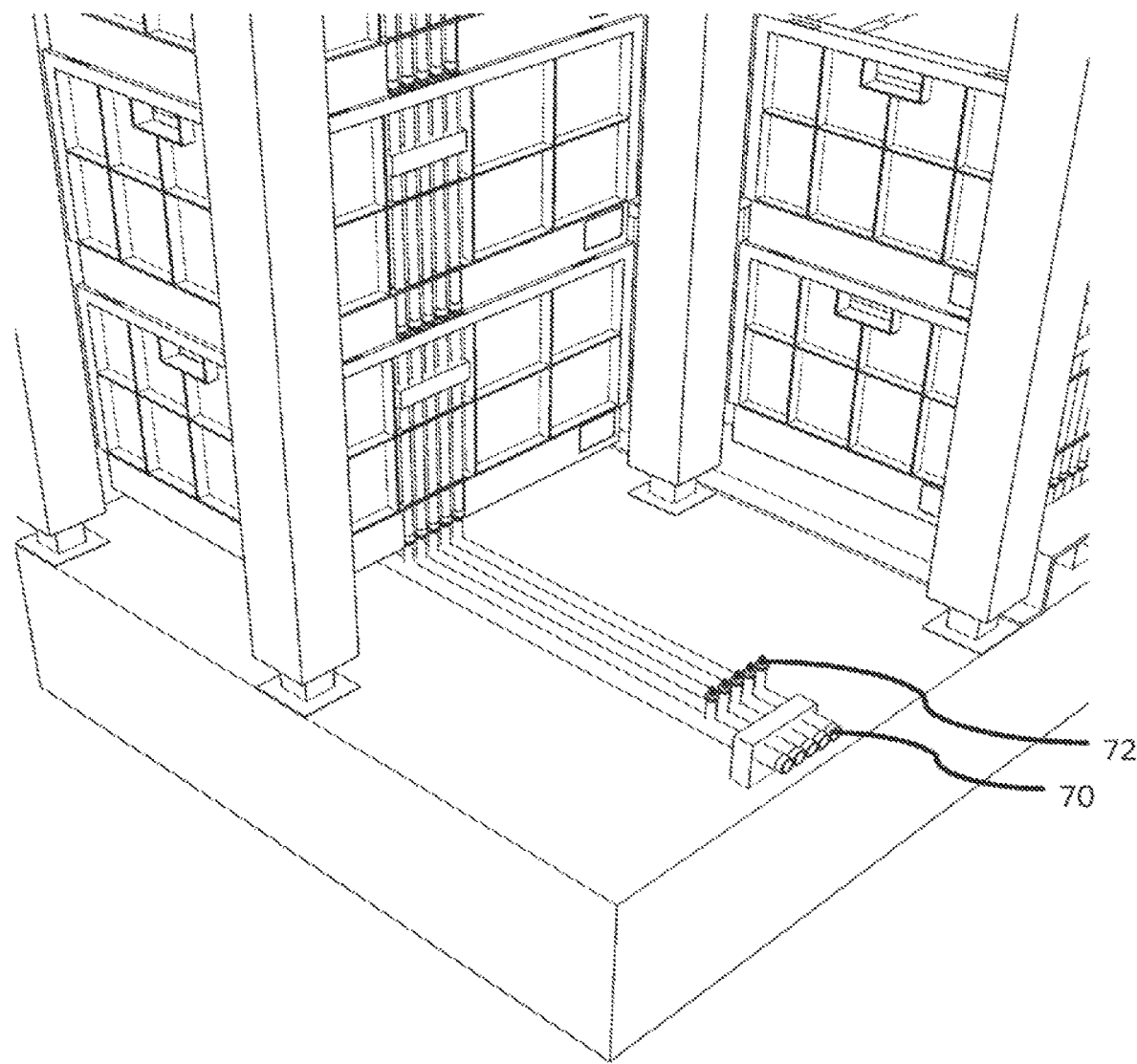
FIG. 11 is a schematic perspective view of the connections between the base of the storage and retrieval system and the bottom container within a stack.

FIG. 11 shows the connection means between a stack 12 of containers and the supply means in the base 76 of the system in more detail. It will be appreciated that this is one example only of a suitable connection means and that any connector system of releasably connecting containers 10 to a power, electrical, lighting, telecommunications or other supply may be envisaged.

Figure 12:
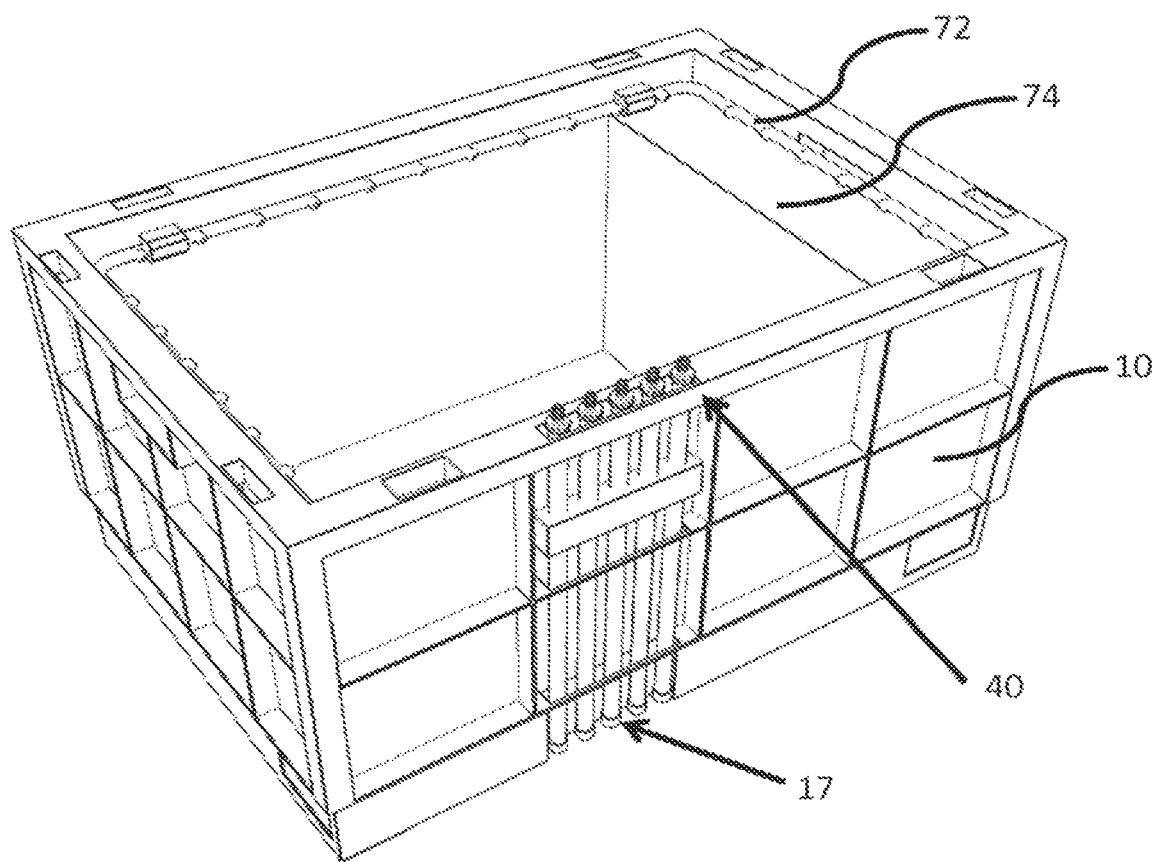
FIG. 12 is a schematic perspective view of a container in accordance with a further form of the invention, the container comprising fluid supply means and further comprising a fluid reservoir.

FIG. 12 shows yet another form of individual container 10 in accordance with the invention from a stack 12, the bin 10 comprising fluid supply means 72 and further comprising a fluid reservoir 74. The contents of the bin 10 may require water to be supplied thereto. Accordingly, the bin 10 is provided with a reservoir 54 that may be filled with a liquid or gas. In order to fill the reservoir 74, the bin 10 may be removed from the stack 12 by the robotic load handling device and taken to a location in the system where the reservoir can be topped up as required. Alternatively, the required fluids may be routed to specific containers 10 via the uprights 16 of the grid system.

Figure 13:
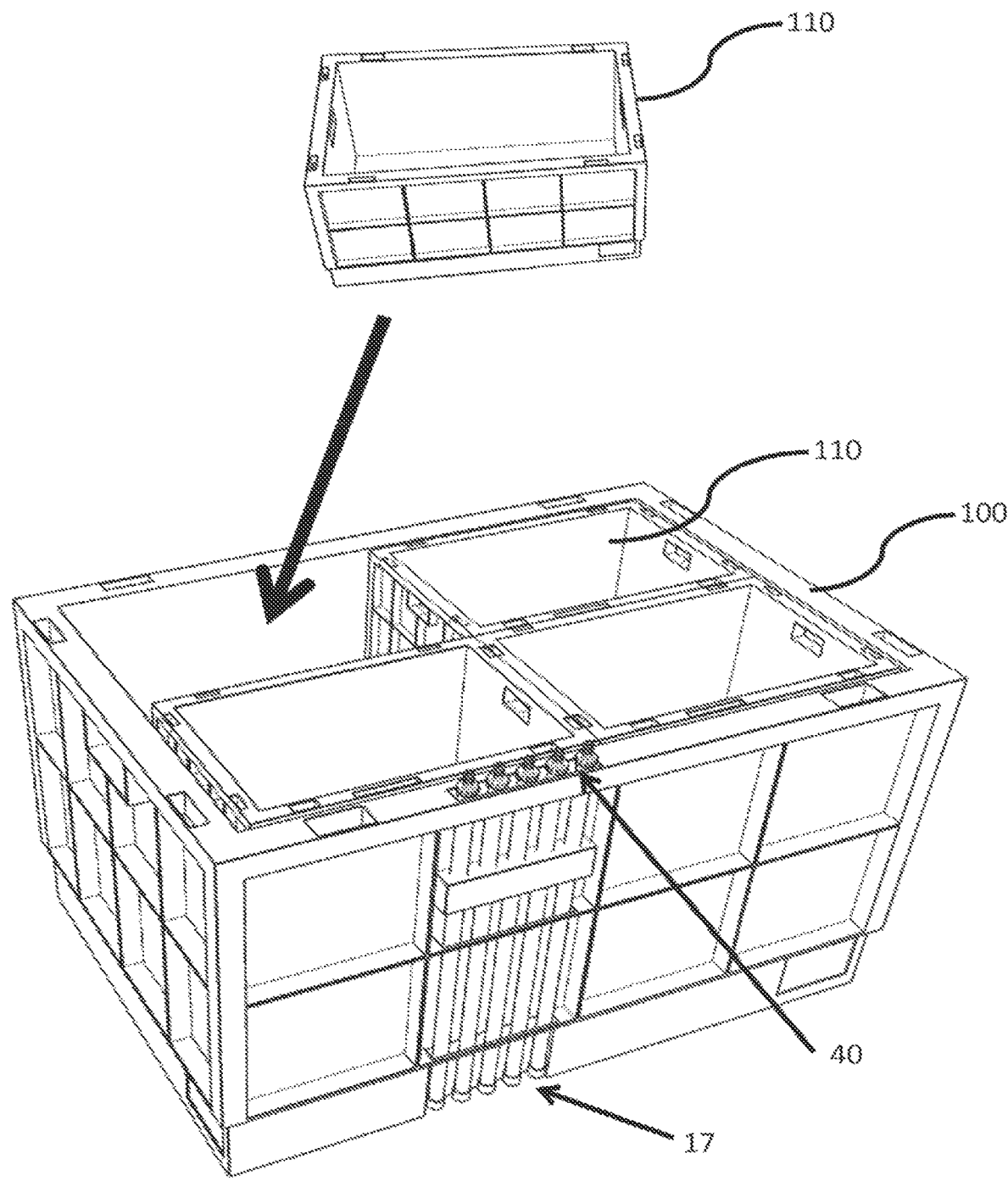
FIG. 13 is a schematic perspective view of a further embodiment of the invention in which a container comprises a plurality of smaller containers, each of the smaller containers comprising a given service connectable via the connection means located on at least one side of the container.

FIG. 13 shows a further embodiment of the invention in which a container 100 comprises a plurality of smaller containers 110, each of the smaller containers 110 comprising a given service connectable via the connection means 17, 40 located on at least one side of the container.

In use, the storage system described above with reference to the Figures, comprises a large number of containers 10 arranged in stacks 12. In one embodiment of the invention, the storage system comprises containers 10 of different categories dispersed within the system. For example, there may be empty containers 10, containers 10 containing goods to be stored, containers containing services such as power supplies or communications means, containers 10 capable of heating, containers 10 capable of cooling, containers 10 comprising goods requiring liquids and/or light. It will be appreciated that some or all of the containers 10 may contain one or more of the services or devices referred to above. For example a bin 10 with a reservoir 54 may also be provided with lighting means 60.

The provision of data logging and condition monitoring means in containers 10 within the stacks 12 enables a map of the condition and topography of the system to be generated that would not otherwise be possible unless specific containers 10 were removed and examined. Furthermore, inclusion of camera means within a number of containers 10 allows for containers to be moved around the system to inspect the condition of the grid and or other containers or containers 10.

Furthermore, providing services to specific individual containers 10 either via the uprights 16 or via bin-to-bin contacts, enables goods having different requirements to be stored within the same storage system without resorting to portioning the system and separating goods with different requirements in to separate sections of the grid.

Additionally, connections between containers 10 and communications between containers 10 and stacks 12 generates a knowledge base of the storage system in real time that will assist in the event of a power outage for example, that will aid in possible disaster recovery. The alternative would be to empty all the containers and rebuild the stack which would be inefficient and costly.

The system described above has many varied uses. The foregoing description provides details of specific controlling and monitoring services that may be used in some of the following circumstances. Some non-limiting examples, in accordance with aspects of the invention, of applications for smart bin or container 10 systems may include, but are not limited to the following:

A container 10 comprising temperature sensing means may be used to monitor the temperature in chilled, frozen or ambient sections of the storage system. For example, an increase in the temperature in an ambient portion of the system could result in chocolate melting or ignitables igniting. This may be a particular problem in the summer months in warmer climates.

A container 10 comprising camera means maybe used to monitor the condition of the grid and other containers 10 in the stacks 12. The robotic load handling devices 30 may be used to move the containers 10 around the storage system to inspect portions of the system or other containers 10 or stacks 12 as required. This may be relevant if there have been spillages in the system or other issues with the integrity of the system, grid or containers.

A container 10 identification means within each individual container 10 together with communications means between containers 10 or stacks 12 may be used to create a topological profile of the storage system, where peer-to-peer identity is possible. In the event of a catastrophic failure of the systems controlling the stacks, the topological information may be used to create a disaster recovery situation.

Individual containers 10 may be provided with lighting means 60, for use in conjunction with monitoring and camera means in order to assist in inspection of individual containers 10 or the system as a whole. Furthermore, contents of the containers 10 may benefit from lighting of specific wavelengths or a range of wavelengths. For example, under ripe fruit may be brought on using appropriate lighting. Additionally, it may be possible to use containers or containers 10 for cultivation purposes.

The storage containers and containers 10 may be provided with sensors to detect gas, smoke, fire or heat, the sensors activating sprinkler systems to put out any fire.

Should the storage system be used, for example, to store cars in a mechanised car park, as described in UK patent application number GB1514428.0, the contents of which is incorporated herein by reference, sensors detecting fire or smoke may activate sprinklers and communication means may be provided to directly communicate with a central monitoring system or directly to the emergency services.

A container 10 comprising gas sensing means may be used to monitor the condition of fruit in a chilled portion of the system. Ripening fruit give off gases so monitoring for these specific gases may provide an indication of over ripening fruit in storage. Should this be detected, containers 10, having cooling means within the bin may be cooled to prevent over ripening of the contents.

Should the containers or containers 10 be used for storing alternative goods such as parcels, the containers or containers 10 may contain weighing means such as scales to monitor the weight of parcels in storage before onward distribution.

In a second embodiment of the invention, the containers 10 comprise intelligence means such as routers, calculators or servers (not shown). The intelligence means may communicate via peer to peer communications across the containers 10 in the system. Furthermore, the communications may occur via contactless light through air communications, however any other suitable means for communication may be used.

The intelligence means may be powered and controlled by suitable power supply means and power control means such as those means described above.

Utilising the proximity of the containers 10 provides a system having relatively short communication distances between the intelligence means located in the containers 10. The relatively short distances reduce latency between the intelligence means, the system being capable of fast and powerful operation.

Such a system may require extensive cooling. Such cooling means may be provided as described above or via cooling means being passed up the uprights 16 of the framework 14 from the base of the system.

In use, each calculator or server may be connected with at least its six neighbours via optical channels. For example, using slightly transparent mirrors, each calculator could transmit or receive into this channel without disturbing any other traffic, for example, using wavelength division multiplexing. In this way, each node could have a speed of light, exactly defined latency, connection to every other node in the system.

For example, the communications means may comprise laser based transmission through air. However, other communication means may be provided, for example connection of the servers or calculators by fibre optic tentacles extending to make contact with neighbours.

For example for 100,000 containers 10, each comprising powerful intelligence means, may be combined in to a machine in a stack 60×60 and 28 tall in a 14 k sq ft space. Or 1 million containers in a 200×160 grid, 33 tall in a 125 k sq ft building.

It will be appreciated that there are numerous applications that may benefit from this instantaneous and defined node to node connectivity. For example, flow simulations and the like for aircraft design, weather forecasting or climate models, financial trading calculations, protein synthesis calculation and simulations of chemical reactions with whole organisms may advantageously benefit from such large, densely packed intelligence means. However, it will be appreciated that these examples are given for example only and are not limiting.

It will further be appreciated that individual containers may be provided with one service, a selection of services or all services described. Furthermore, the services listed should not be regarded as limiting. Any form of service that is capable of being carried or transmitted to a bin 10 may be envisaged.

Furthermore, although the embodiments of the invention described above, and shown in the Figures, detail systems in which the containers 10 are all of a substantially identical size and shape, it will be appreciated that this need not be the case. As described in UK Patent Application No. GB1506364.7 filed 15 Apr. 2015, incorporated herein by reference, it will be appreciated that such a system may be configured to handle containers 10 of multiple sizes by use of load handling devices 30 of differing sizes capable of lifting and moving containers 10 of multiple sizes.

Moreover, the embodiments described above and detailed in the accompanying figures assume that the storage system comprises containers 10 in stacks 12 disposed within a framework 14 in an unfettered manner. It will be appreciated that the system may be partitioned by suitable partitioning means into smaller sub sections defined by, for example temperature. In this way it would be possible to have an ambient portion, a chilled portion and a frozen portion for example. It will also be appreciated that the partitioning may have additional advantages, for example, partitioning enables sections of the storage system to be isolated from other sections. This may be necessary if there is a fire, for example, and fire suppressant means are used in a given area to extinguish the fire. Furthermore, in the case where the system is used for alternative uses, there may be advantages in having different gaseous atmospheres in different portions of the system. This may be achieved by partitioning the system. It will be appreciated that the partitioning means may be temporary and remotely deployable, for example roller shutters disposed under the grid.

Many variations and modifications not explicitly described above are also possible without departing from the scope of the invention as defined in the appended claims.

What is claimed:

1. A storage system comprising:
a first set of parallel rails or tracks and a second set of parallel rails or tracks extending transverse to the first set in a substantially horizontal plane to form a grid pattern including a plurality of grid spaces forming a framework;
a plurality of containers arranged in stacks, located beneath the rails, each container having a co-operating surface with one or more adjacent containers in an associated stack; and
at least one load handling device disposed on the grid, arranged to move laterally above the stacks on the rails, the load handling device including a lifting device arranged to lift one or more containers, or parts thereof, from a stack,
wherein each container includes:
  connection means at the co-operating surface with the one or more adjacent containers, the connection means having:
  a push fit male connector located at a top edge of the container; and
  a female connector at a bottom edge of the container,
  wherein the one or more adjacent containers are linked by routing means, which form moldings on each container, and
  wherein the connection means have spring-loaded contacts.

2. A storage system according to claim 1, wherein the connection means is releasable which allows the adjacent containers in a stack to be connected and disconnected.

3. A storage system according to claim 1, wherein the connection means allows power transmission between the adjacent containers in the stack.

4. A storage system according to claim 1, wherein the connection means allows data transmission between the adjacent containers in the stack.

5. A storage system according to claim 1, wherein the connection means allows signal transmission between the adjacent containers in the stack.

6. A storage system according to claim 1, wherein the sprung-loaded contacts are deposited on the co-operating surfaces of the adjacent containers for power transmission between the adjacent containers.

7. A storage system according to claim 1, wherein the sprung-loaded contacts are deposited on the co-operating surfaces of the adjacent containers for data transmission between the adjacent containers.

8. A storage system according to claim 1, wherein the sprung-loaded contacts are deposited on the co-operating surfaces of the adjacent containers for signal transmission between the adjacent containers.

9. A method of linking containers in a storage system having a first set of parallel rails or tracks and a second set of parallel rails or tracks extending transverse to the first set in a substantially horizontal plane to form a grid pattern including a plurality of grid spaces forming a framework, a plurality of containers arranged in stacks, located beneath the rails, each container having a co-operating surface with one or more adjacent containers in an associated stack; and at least one load handling device disposed on the grid, arranged to move laterally above the stacks on the rails, the load handling device including a lifting device arranged to lift one or more containers, or parts thereof, from a stack, wherein each container includes: connection means at the co-operating surface with an adjacent container in the associated stack, the connection means having: a push fit male connector located at a top edge of the container; and a female connector at a bottom edge of the container, the method comprising:
moving, by the at least one load handing device on the grid, a first container into one of the of stacks in the framework;
releasably connecting the female connecter at the bottom edge of the first container to the push fit male connecter at a top edge of a second container in the one stack, and
transmitting any of data, power, and signals between the first and second containers by a sprung-loaded contact on the cooperating surfaces of the first and second containers.

* * * * *